United States Patent [19]
Wilcox

[11] 3,776,252
[45] Dec. 4, 1973

[54] SELF-REGULATING SYSTEM FOR MIXING LIQUIDS

[75] Inventor: Harold R. Wilcox, Maynard, Mass.

[73] Assignee: Riggs & Lombard, Inc., Maynard, Mass.

[22] Filed: Dec. 3, 1971

[21] Appl. No.: 204,538

[52] U.S. Cl............... 137/99, 417/403, 417/36, 91/275, 137/101.25
[51] Int. Cl................... G05d 9/12, F16k 19/00
[58] Field of Search........... 91/275; 137/99, 101.25; 417/36, 41, 403, 404

[56] References Cited
UNITED STATES PATENTS

| | | | |
|---|---|---|---|
| 3,345,997 | 10/1967 | Miller et al. | 137/101.25 X |
| 3,131,707 | 5/1964 | Cordis | 137/99 |
| 3,530,873 | 9/1970 | Arp | 137/99 |
| 3,001,360 | 9/1961 | Budzich et al. | 91/275 X |
| 3,424,092 | 1/1969 | Hortvet et al. | 91/275 X |
| 1,804,449 | 5/1931 | Florez | 417/41 |

Primary Examiner—Robert G. Nilson
Attorney—Morse, Altman & Oates

[57] ABSTRACT

A system is provided for mixing, on demand, two or more liquids at a constant ratio with one of the liquids serving to pump one or more of the other liquids into the system. The piston of one cylinder is drivingly connected to the piston of another cylinder, the first cylinder being connected to a source of pressurized liquid, such as water, which serves as a driving force for the piston of the second cylinder which is connected to the source of liquid, such as a detergent, whereby a constant ratio of liquids is maintained. Conduits are provided to mix the discharges of the two cylinders prior to delivery to a chamber such as a washing tank for a running textile web. A control system is provided for actuating the pumping system to maintain a constant level of mixed liquids in the chamber.

1 Claim, 1 Drawing Figure

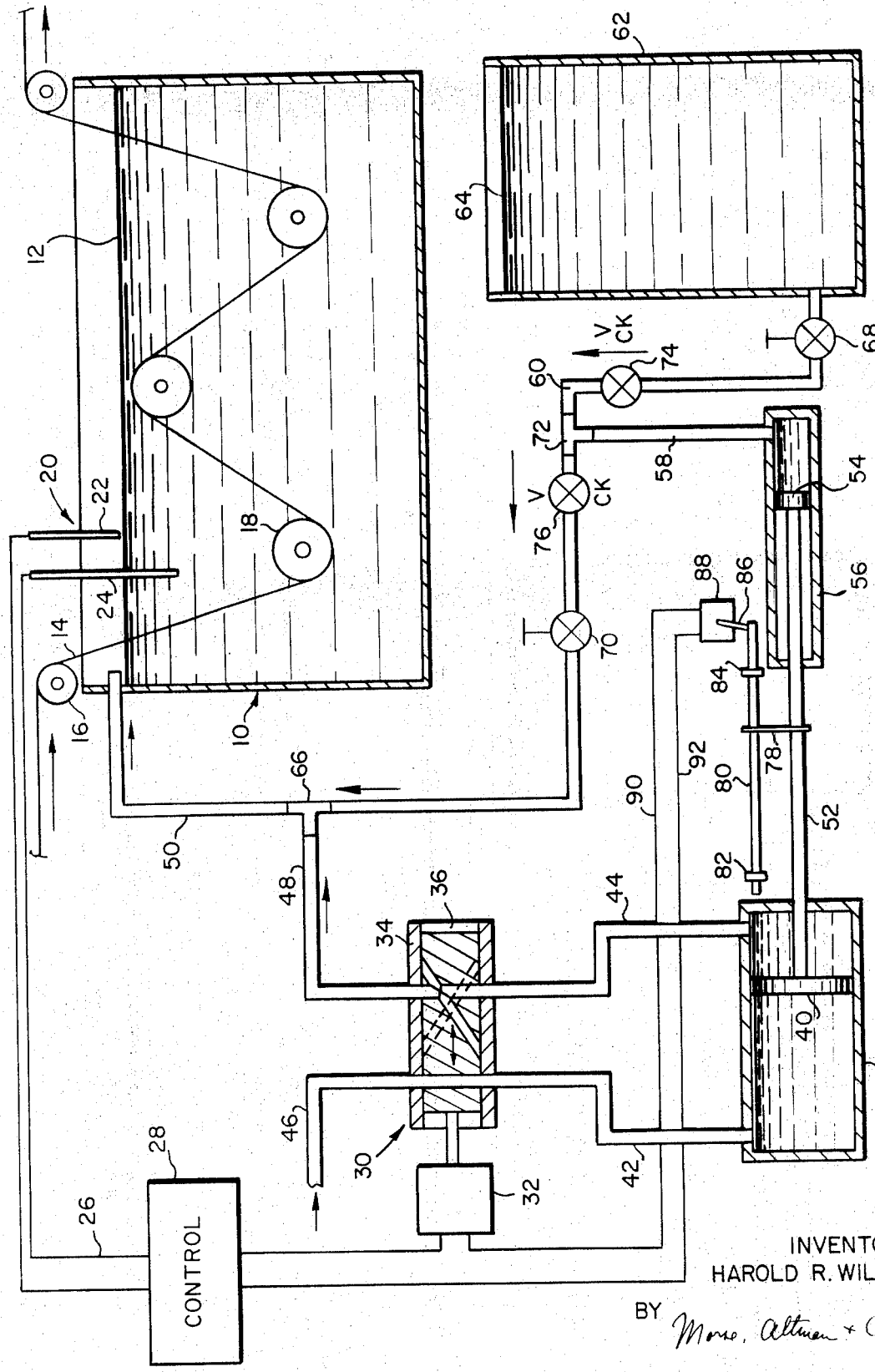

SELF-REGULATING SYSTEM FOR MIXING LIQUIDS

BACKGROUND OF THE INVENTION

1. Field of the Invention

This invention relates generally to a proportioning system for liquids and more particularly is directed towards a self-regulating system for mixing, on demand, two or more liquids at a constant ratio for delivery to a textile treatment station or the like.

2. Description of the Prior Art

In many industrial processes there is a need to mix two or more liquids proportionately prior to delivering the resulting mixture to some point in a system. In the processing of textile materials, for example, there is a common need to pass a running web through different solutions, the concentrations of which should remain constant in order to maintain quality control in the finished product. Typically, water and detergent are often mixed in a tank through which a web is passed during a cleaning process. Unless the ratio of water to detergent is maintained within certain limits, the cleaning action becomes irregular. While various mixing systems have been available heretofore, none has been entirely satisfactory from the standpoint of simplicity, reliability and accuracy.

Accordingly, it is an object of the present invention to provide a system for automatically mixing, on demand, two or more liquids in exact ratios regardless of flow rates or other factors. It is a further object of this invention to provide a simple, low cost system for mixing liquids for use particularly in a textile treatment system.

SUMMARY OF THE INVENTION

This invention features a self-regulating, automatic feed system for mixing and delivering two or more liquids, comprising a first piston and cylinder, at least one second piston and cylinder, the second piston being drivingly connected to the first piston, conduit means connecting said first cylinder to a pressurized source of a first liquid, said second cylinder to a source of a second liquid and connecting the discharges of both of said cylinders, valve means in the conduit means for controlling the flow of the liquids in said conduit means, remote sensing means for monitoring the discharge of said cylinders and control means responsive to the monitoring means for actuating said first piston.

BRIEF DESCRIPTION OF THE DRAWINGS

FIG. 1 is a somewhat schematic diagram of a self-regulating system for mixing two or more liquids and made according to the invention.

DETAILED DESCRIPTION OF THE PREFERRED EMBODIMENT

Referring now to the drawings, the reference character 10 generally indicates a tank or other vessel adapted to contain a quantity of a solution 12 comprised of two or more liquids pre-mixed prior to entering the vessel 10. In the illustrated embodiment, the vessel 10 is employed to treat a running web 14 of textile material such as a woven or knit fabric which is guided by rollers 16 and 18 into and out of the solution 12. A typical application of the invention may involve water and a detergent for washing the web 14 during the production process. Other solutions may also be employed such as, for example, dye solutions, coating solutions and a variety of other solutions customarily employed in the production of textiles.

In order to maintain a constant level of the solution in the vessel, a liquid level sensor 20 is employed and, in this embodiment, the sensor 20 is comprised of a pair of probes, namely, a high level probe 22 and a low level probe 24. The probes are of different length and are connected by leads 26 to a control unit 28. The probe senses the level of the solution 12 in the vessel 10 and, depending upon the liquid level at any given time, generates control signals either to add more solution or to stop delivery of solution to the vessel. This is done through the control unit 28 which operates a four-way, solenoid-actuated valve 30 comprised of a solenoid 32, a valve housing 34, and a movable valve member 36 mounted therein and controlled by the solenoid 32. The solenoid-actuated valve 30 is connected to a primary cylinder 38 having a piston 40 mounted for reciprocation therein. A pair of conduits 42 and 44 connect at opposite ends of the cylinder and both pass through the valve 30. Connected to the other side of the valve 30 is a pair of conduits 46 and 48, the conduit 46 being connected to a source of a pressurized first liquid, such as water, while the conduit 48 connects to a discharge conduit 50 which delivers the mixed liquids to the vessel 10.

Drivingly connected to the piston 40 by means of a piston rod 52 is a piston 54 mounted for reciprocation in a secondary cylinder 56. One end of the cylinder 56 is connected by a conduit 58 to a conduit 60 connected at one end to a vessel 62 adapted to contain a quantity of a second liquid 64, such as detergent, dye or other chemical which is to be mixed with the first liquid entering through the conduit 46. The other end of the conduit 60 connects to the discharge conduit 50 at a Tee 66 where the first and second liquids mix prior to entering the vessel 10. The conduit 60 is provided with a pair of manually operated valves 68 and 70, one on either side of a Tee 72, where the conduit 58 connects to the conduit 60, and also a pair of check valves 74 and 76, one on either side of the Tee 72.

Carried by the connecting rod 52 is a thrust bar 78 which reciprocates with the connecting rod and serves to shift a thrust rod 80 at the end of each stroke of the connecting rod. The thrust rod 80 is mounted in suitable bearings for axial sliding movement parallel to the connecting rod 52 and carries a pair of spaced collars 82 and 84, one near either end thereof. One end of the thrust rod 80 engages a lever arm 86 which actuates a limit switch 88 connected by leads 90 and 92 to the solenoid actuated valve 30 and to the control unit 28. It will be understood that at the end of each stroke of the piston the thrust bar will strike one of the collars 82 or 84 to shift the thrust rod 80 axially in one direction or the other and thereby actuate the limit switch 88. This, in turn, will energize the coil 32 of the solenoid-actuated valve 30 to shift the valve 36, causing reciprocation of the primary piston 40 in the opposite direction.

The system works in the following manner. Assuming that the liquid level sensor 20 indicates a need for raising the level of the solution 12 in the vessel 10, the solenoid-actuated valve 30 will be shifted to one of its operative positions and in the position shown in the drawings, the first liquid is delivered under pressure to the left-hand side of the piston 40, causing it to reciprocate to the right, forcing liquid on the right-hand side of the piston out through the conduit 44, through the valve 36, the conduit 48 and to the Tee 66. At the same time the piston 40 moves its connecting rod 62 to the right, reciprocating the piston 54 to the right and forcing the second liquid on the right-hand side of the piston out of the cylinder 56 through the conduit 58 to the Tee 72. The check valve arrangement is such that the check valve 74 will close and the check valve 76 will open to discharge the second liquid into the conduit 60 up to the Tee 66 where the second liquid mixes with the first liquid. The mixed liquids pass through the discharge conduit 50 into the vessel 10.

Insofar as the pumps are positive displacement units, and, insofar as the volume of each of the cylinders is fixed, the discharge of one cylinder remains at a constant ratio with respect to the amount discharged by the other cylinder, whereby, regardless of the rate of operation of the primary cylinder, the ratio of the liquid pumped into the system by the secondary cylinder will remain constant.

At the end of the right-hand stroke, the thrust bar 78 will strike the collar 84, shifting the thrust rod 80 to the right to actuate the limit switch 88. This will cause the solenoid actuated valve 30 to change its position and to reverse the connecting arrangement amongst the conduits to the primary cylinder. Thus, the pressurized first liquid will be delivered from the conduit 46 to the conduit 44 on the right-hand side of the piston, causing it to reciprocate to the left, forcing out the liquid on the left-hand side of the piston through the conduit 42 to the conduit 48 where it will pass into the vessel 10. At the same time, the piston 54 of the secondary cylinder 56 will move to the left producing a suction in the secondary cylinder to draw in a fresh charge of the second liquid for discharge during the next part of the cycle of operation. During the suction stroke of the piston 54, the check valve 74 will open and the check valve 76 will close. At the end of the left-hand stroke of the connecting rod 52, the thrust bar 78 will strike the collar 82 to shift the thrust rod 80 to the left, reversing the limit switch 88 which will return the solenoid actuated valve 30 to its starting position to reciprocate the piston 40 to the right and discharge the second liquid from the secondary cylinder into the conduit where it will mix with the first liquid. It will thus be seen that the second liquid mixes with the first liquid only on alternate cycles although with additional piping and check valves between the tank 62 and the left-hand end of the cylinder 36 the second liquid can be pumped during each cycle.

It will be noted that the same first liquid that is being delivered under pressure into the vessel also serves at the driving force for the primary piston which, in turn, provides the driving force for the secondary piston thereby eliminating the need for a local power-driven pump. When the level of the solution 12 in the vessel 10 reaches a high point, the sensor 20 will signal the control unit 28 which will shift the valve 30 to a null position, stopping the pumping action and the delivery of both liquids to the vessel.

Various modifications can be made to the system. For example, additional pistons and cylinders, each connected to a separate liquid supply, can be drivingly connected to the primary piston to mix three or more liquids.

Having thus described the invention what I claim and desire to obtain by Letters Patent of the United States is:

1. A system for mixing at least two liquids, comprising
   a. a first cylinder and a first piston mounted for reciprocation therein,
   b. a second cylinder and a second piston mounted for reciprocation therein and coaxial with said first cylinder and first piston,
   c. a connecting rod drivingly connecting said first and second pistons to one another,
   d. first conduit means connecting said first cylinder to a source of a first liquid under pressure,
   e. a single multi-position solenoid actuated valve in said first conduit means and adapted to valve said first liquid to alternating ends of said first cylinder,
   f. second conduit means connecting one end only of said second cylinder to a source of a second liquid,
   g. check valve means in said second conduit means,
   h. third conduit means connecting said first and second conduit means for mixing the discharges thereof,
   i. a vessel connected to said third conduit means and adapted to receive said mixed first and second liquids,
   j. liquid level sensing means including a pair of probes mounted to said vessel,
   k. control means responsive to said sensing means and operatively connected to said multi-position valve for actuating said valve to control the flow of said first liquid to said first cylinder, and,
   l. switch mounted adjacent said rod and connected to said four-way valve and responsive to reciprocation of said pistons for actuating said four-way valve.

* * * * *